United States Patent [19]

Bamonte

[11] Patent Number: 5,234,334
[45] Date of Patent: Aug. 10, 1993

[54] DEVICE FOR MAKING PIZZA ROUNDS

[76] Inventor: Bernard Bamonte, 109 Salem St., Boston, Mass. 02113

[21] Appl. No.: 833,046

[22] Filed: Feb. 10, 1992

[51] Int. Cl.[5] ............................................. A21C 3/00
[52] U.S. Cl. .................................... 425/403; 99/432; 425/470; 426/502; 426/512
[58] Field of Search ............... 425/383, 402, 403, 470; 426/496, 502, 503, 512; 99/428, 430, 432, 433, 439, 442, DIG. 15; 249/DIG. 1

[56] References Cited

U.S. PATENT DOCUMENTS

| | | | |
|---|---|---|---|
| 2,734,464 | 2/1956 | Hallock et al. | 426/502 |
| 3,194,185 | 7/1965 | Spinosa | 426/502 |
| 3,322,074 | 5/1967 | Malnory | 99/432 |
| 3,864,071 | 2/1975 | La Monica | 425/470 |
| 4,808,104 | 2/1989 | D'Orlando | 426/512 |

*Primary Examiner*—Jay H. Woo
*Assistant Examiner*—James P. Mackey
*Attorney, Agent, or Firm*—Alvin Isaacs

[57] ABSTRACT

Disclosed is a device adapted for providing rapid preparation of pizza rounds wherein the rounds are characterized as possessing a uniformity and symmetry not obtainable, at least with any consistency, when prepared entirely by hand.

11 Claims, 3 Drawing Sheets

DEVICE FOR MAKING PIZZA ROUNDS

BACKGROUND OF THE INVENTION

This invention relates to a device for shaping the periphery of a pizza round and, more particularly, to such a device which can provide a uniformity not obtainable, at least with any degree of consistency, when the round is shaped entirely by hand manipulation.

As is well know, pizza has become one of the most popular foodstuffs for young and old alike. Since the early 80's, the boom in pasta in general and pizzas in particular has skyrocketed. Pizzarias have sprung up in places in America where they were never before obtainable. The craving for pizza has invaded the home as well where parents join with their children in improvising their pizzas of choice.

Pizzas are typically prepared by first preparing the pizza dough which is then shaped into a generally circular dough bomb which will usually weigh on the order of 10–12 ounces for the 9, 12 or 14 inch pizzas and will weigh more, e.g. as much as 22 ounces for larger ones.

The bomb of pizza dough is then placed on the counter and pressed and shaped by hand into a round, usually with a rim or slight elevation around the circumference to retain the topping and for esthetic reasons. The round is then tossed or stretched by hand to the desired size, after which it receives the topping of choice and is placed in the oven for baking.

In shaping the bomb by hand, it is not possible, at least with any degree of consistency, to prepare a pizza where the periphery of the crust does not have bumps and depressions which detract form its overall appearance. The thinner of these non-uniform areas will tend to burn in the oven and, moreover, the structural integrity of the pizza leaving the oven may be impaired.

For this reason, in the highly competitive world of pizzarias as well as in the home where the chef is not as experienced in the art, there is a great and ever increasing need for a device which will assist in the manual preparation of the rounds form the pizza bombs to obtain rounds characterized consistently as possessing uniformity and symmetry throughout.

To be commercially acceptable, such a device must additionally be easy to use, adaptable for preparation of pizzas of different sizes, as well as possessing the capability of rapidly preparing a plurality of pizzas. For example, in peak hours, a single operator in a pizza establishment may be required to prepare on the order of a pizza a minute.

Stated simply, the task of this invention is to provide a device of the foregoing description for preparing pizza rounds.

BRIEF DESCRIPTION OF THE INVENTION

In accordance with this invention, the task is solved in an elegant manner by providing a device comprising a base sheet material having an upstanding actuate rim having a concave inner surface against which the pizza dough may be pressed and rotated by hand rapidly to form the pizza round. While not critical to the practice of this invention, the device will preferably have detent means to prevent movement in the direction in which manual force is applied in pushing the dough against the rim, i.e. rearward movement away form the pizza chef.

DETAILED DESCRIPTION OF THE INVENTION

Figure 1:
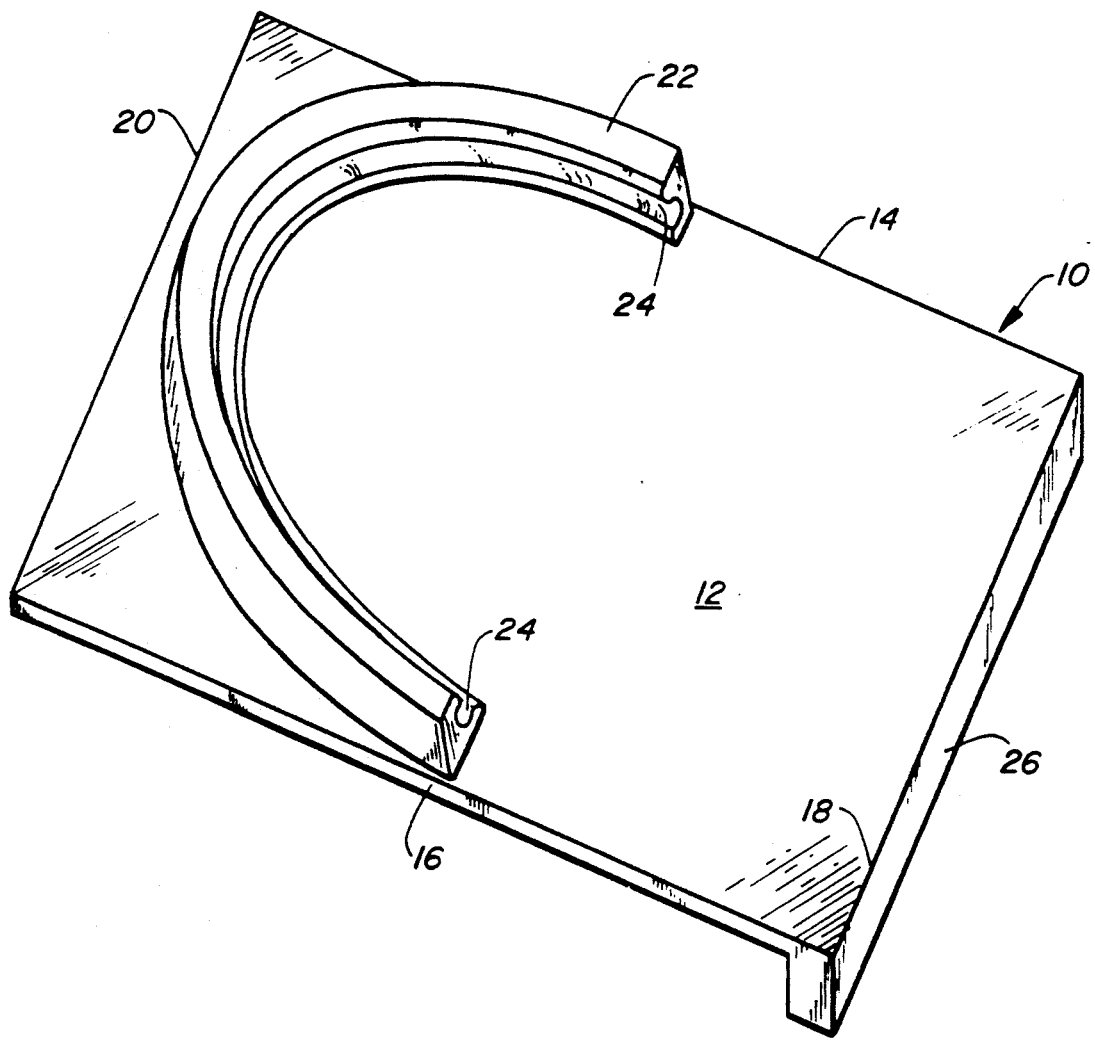
FIG. 1 is a perspective view illustrative of the device of this invention.
Figure 2:
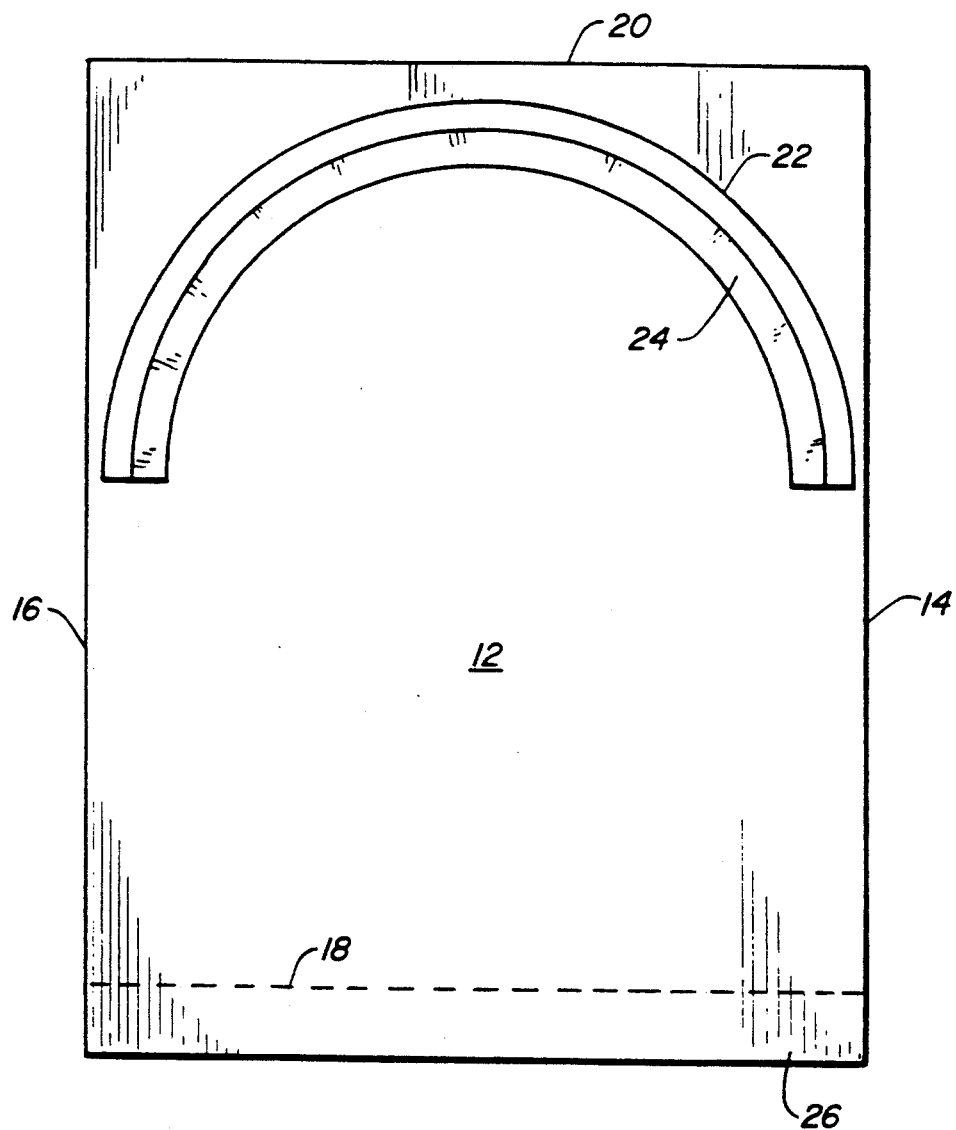
FIG. 2 is a top view of the device shown in FIG. 1.
Figure 3:
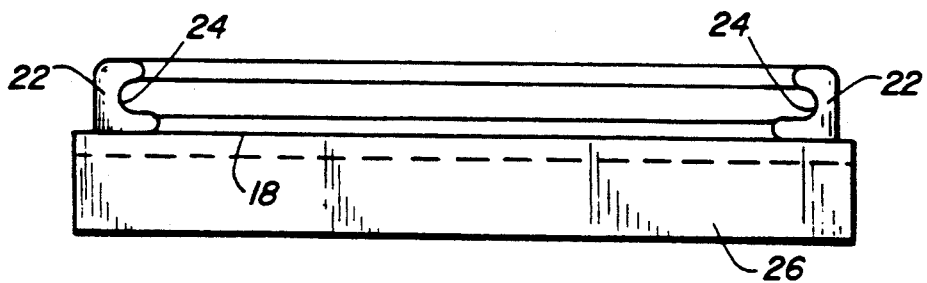
FIG. 3 is a front view of the device of FIG. 1.
Figure 4:
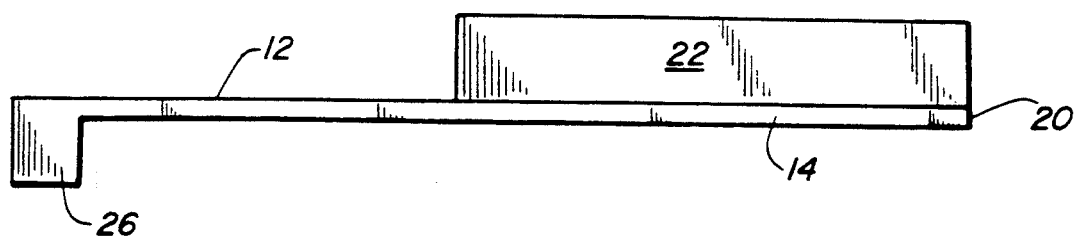
FIG. 4 is a side elevational view of the device of FIG. 1.

As was heretofore mentioned, the task of this invention is to provide means for assisting in the manual preparation of pizza rounds (or "shells" as they are sometimes called) which are characterized as being uniform and symmetrical in configuration.

In accordance with this invention, this task is solved in an elegant manner by providing a cost-effective device of simplified construction and ease of handling comprising a base sheet having an upstanding arcuate rim with a concave inner surface against which the pizza dough bomb may be pressed and rotated by hand rapidly to form the desired round.

The nature and objects of this invention may best be understood by reference to the appended illustrative drawings taken in conjunction with the following detailed description.

With reference to FIGS. 1-4, the novel device of this invention is shown to comprise a flat generally rectangular base sheet 12 having opposed side or lateral edges 14,16, a front or forward edge 18 and a back or rearward edge 20. A generally arcuate upstanding rim 22 is mounted on sheet 20 between the side edges 14,16 and back edge 20. As shown, the inner surface of rim 22, i.e. The surface facing front edge 18, is concave for reasons which will be readily apparent hereinafter in the discussion in the use of the device.

As previously stated, while not critical to the invention, the device will preferably have detent means to prevent rearward movement of the device away from the operator during use. In the preferred form, the detent means will be what is termed in the art as a "bench hook" 26, namely a sheet 26 extending downwardly from front edge 18. While shown to be of the same length as the distance between the side edges 14,16 defining the width of sheet 12, it will be appreciated that it may, if desired, be shorter. In any case, as it the case with bench hooks, it will extend over the edge of the counter or work surface and thereby prevent rearward movement when rearward pressure is applied to the device.

Rim 22 and/or bench hook 26 may be individual components secured to sheet 12 in per se known fashion, e.g. by screws from the reverse or underside of the device, welding (in the case of metal materials), adhesive or heat sealing, etc., which means will be a matter of choice within the expected judgment of the skilled worker and accordingly will per se comprise no part of this invention. Also, it is envisioned that the individual components may be provided as a unitary device as by injection molding or the like.

In operation, the device is place don the working surface with the bench hook 26 extending over the counter edge. In known manner, a suitable flour such as cornmeal is then sprinkled over the surface of sheet 12 to prevent adherence of the pizza bomb to the surface.

Also, in conventional manner pizza dough is prepared, proofed or conditioned and shaped into a bomb having the desired weight. A typical bomb of pizza dough will be generally round, weigh on the order of 10-22 ounces depending on the pizza size and be perhaps 6-8 inches in diameter.

In operation, the bomb is placed around the middle of the sheet 12 and while holding it firmly on the sheet with one hand the bomb of pizza dough is advanced and pushed against the concave surface 24 of the annular rim 22. While holding it against the rim, the pizza is turned so that the entire circumference of the bomb is shaped by the rim to provide a round which is characterized as being uniform and symmetrical with little or no "bumps" or depressions. Typically, the peripheral portion within the circumference is then pressed down with the fingers to form an annular lip in order to provide an esthetically pleasing appearance for the finished pizza as well as to prevent the edges of the topping to be applied from spilling over.

At the completion of this operation to prepare the round, which is accomplished in just seconds after placing the bomb on the device, the round is removed and tossed or stretched to the desired circumference, e.g. 9, 12, 14, 16, or 18 inches or greater. The topping of choice is then placed on the round, followed by placement in the oven for baking, typically with the aid of a longhandled woodenware pizza peel. When done, it is of course removed and ready to be served.

Since the pizza chef will typically spend hours utilizing the device in preparing pizza rounds, it will be appreciated that the depth of the device, i.e. the distance between front edge 18 and the furthermost point of rim 22 should not be so great as to cause the chef to bend forward unduly in preparing the rounds. To avoid undue strain on the back, the depth should preferably to on the order of 13 to 17 inches, 15 inches having been found to be particularly desirable. Both the depth and the width of the base sheet should of course be of sufficient dimension to contact the entire surface of the rim 22. Preferably each dimension of the base sheet will provide a small space, say, for example, on the order of 0.5 inch between rim and each side edge as well as between the midpoint of the rim and rear edge 20. It will be appreciated that the depth and width can be still greater without departing from this invention. However, any additional width serves no useful purpose. In like manner, any additional depth serves no usefully purpose unless sit is such that the rear edge 20 would then abut the wall or the back of the counter, thus in effect providing detent means which obviates the need for bench hook 26.

Figure 5:
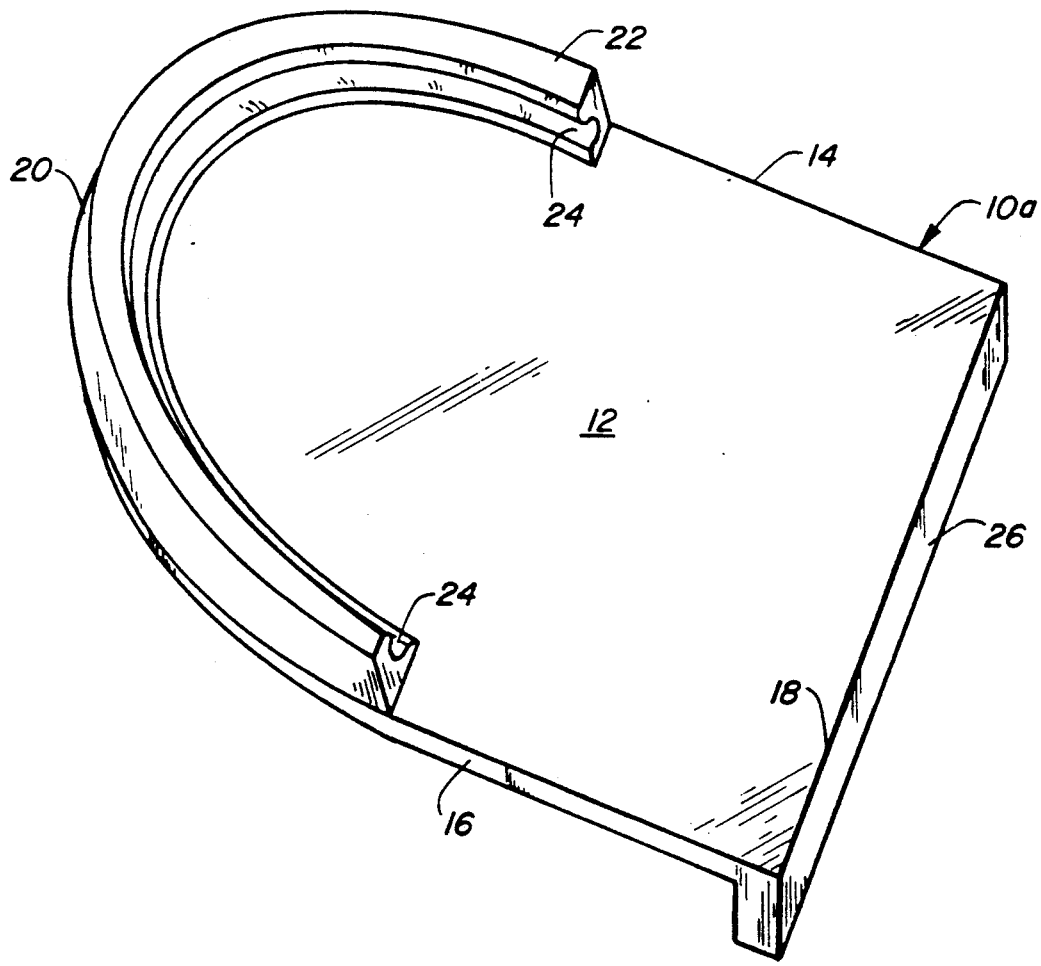
FIG. 5 is a perspective view illustrating another form of the novel device of this invention.

In the preferred embodiment, as shown in FIGS. 1-4, the base sheet is generally rectangular. However, it need not be and FIG. 5 illustrates one alternate embodiment wherein the rear portion of side edge 14,16 are curved so as to join at the midpoint of the rear edge 20. Where, as in the most preferred embodiments of this invention, a bench hook 26 is provided, it will of course be appreciated the front edge 18 should be generally flat in order to engage the entire surface of the bench hook.

Arcuate rim 22 should comprise an arc of a circle and preferably be a semi-circular arc having a diameter on the order of 10-13 inches, most preferably 11-12 inches. As will be appreciated, the height of the rim will be dependent upon the thickness of the pizza contemplated. It will typically be on the order of one inch high.

The various components of the novel device of this invention may be made of any rigid material which meets FDA or other health regulations for use in the preparation of foodstuffs. Such materials include metals such as aluminum or stainless steel and plastics made form polymeric materials such as the polyolefins customarily employed in the food industry, e.g. polyethylene or polypropylene. In any case, the selection of the particular materials to be employed will be a matter of individual choice or whim within the expected judgment of the skilled worker and will be dependent upon such factors as cost to manufacture. Accordingly, the selection will per se comprise no part of this invention.

Where screws or other metal fasteners are utilized to secure the rim and/or bench hook to the base sheet, it will of course be appreciated that rust-proof metal materials should be employed to meet the usual rigid health standards.

It is to be expressly understood that this invention is not restricted to the device shown in the illustrative drawings or described in the foregoing specification. Obviously, various changes may be made without departing form the spirit and scope of the invention herein contemplated.

For example, while the preferred extent means is stated to be the bench hook shown in the illustrative drawings, it is contemplated that other less preferred detent means may be employed. For instance, particularly where the counter space permits permanent installation, the base 12 may be permanently or releasably secured to the countertop of the work station, e.g. by adhesive means, bolts, screws, clips, or the like.

In like manner, the geometric configuration of the base sheet is not critical. While a rectangular form is preferred, it may be circular, oblong, or of any desired shape.

Since certain changes may be made without departing from the scope of the invention herein contemplated, it is intended that the foregoing specification and drawings shall be taken as illustrative and not in a limiting sense.

What is claimed is:

1. A device adapted for use in the manual preparation of pizza rounds comprising:
    a flat base sheet having a front portion adapted to receive a quantity of pizza dough to be shaped int a pizza round; and
    an upstanding arcuate rim secured to the base sheet rearward of the front portion, the upstanding arcuate rim having a concave surface facing the front portion against which the pizza dough can be pressed to form the round.

2. A device as defined in claim 1 including detent means for preventing rearward movement of the device responsive to pressure applied in pressing the dough on the front portion of the base sheet against the concave surface of the arcuate rim.

3. A device as defined in claim 2 wherein the detent means comprises a bench hook adapted to engage a front edge of a surface of a work station on which the device is placed for preparing the round.

4. A device as defined in claim 1 in which the arcuate rim comprises a semicircular arc.

5. A device as defined in claim 4 wherein the arc has a diameter of from about 10 to about 13 inches.

6. A device as define din claim 4 wherein the arc has a diameter of about 11 to about 12 inches.

7. A device as defined in claim 1 wherein the base sheet is substantially rectangular.

8. A device adapted for use in the manual preparation of pizza round, comprising:
- a generally rectangular flat base sheet having a front edge, a rear edge, and opposed lateral edges extending between the front and rear edges; and
- a generally semicircular upstanding arcuate rim secured to the base sheet adjacent its rear edge, the arcuate rim having a concave surface facing the front edge of the base sheet and against which a quantity of pizza dough may be pressed and shaped into a pizza round.

9. A device as defined in claim 8 including detent means for preventing rearward movement of the device responsive to pressure applied in pressing the pizza dough against the concave surface of the arcuate rim.

10. A device as defined in claim 9 wherein the detent means comprises a bench hook secured to the front edge of the base sheet.

11. A device as defined in claim 10 wherein the semicircular rim has a diameter on the order of from about 10 to about 13 inches.

* * * * *